(12) United States Patent
Furukawa et al.

(10) Patent No.: US 8,260,007 B1
(45) Date of Patent: Sep. 4, 2012

(54) SYSTEMS AND METHODS FOR GENERATING A DEPTH TILE

(75) Inventors: Yasutaka Furukawa, Bellevue, WA (US); Carlos Hernandez Esteban, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/308,357

(22) Filed: Nov. 30, 2011

Related U.S. Application Data

(60) Provisional application No. 61/524,307, filed on Aug. 16, 2011.

(51) Int. Cl.
*G06K 9/00* (2006.01)

(52) U.S. Cl. ............ 382/113; 382/103; 382/154; 702/5; 702/33

(58) Field of Classification Search .................. 382/103, 382/106, 108, 109, 113; 702/2, 5, 33, 35
See application file for complete search history.

(56) References Cited

U.S. PATENT DOCUMENTS

| | | | |
|---|---|---|---|
| 6,608,672 B1 * | 8/2003 | Shibusawa et al. ............. | 356/73 |
| 6,671,582 B1 * | 12/2003 | Hanley ........................... | 700/245 |
| 6,675,125 B2 * | 1/2004 | Bizjak ........................... | 702/179 |
| 6,853,937 B2 * | 2/2005 | Shibusawa et al. ........... | 702/100 |
| 7,027,981 B2 * | 4/2006 | Bizjak ........................... | 704/225 |
| 7,206,420 B2 * | 4/2007 | Bizjak ........................... | 381/106 |
| 7,212,640 B2 * | 5/2007 | Bizjak ........................... | 381/106 |
| 7,783,092 B2 * | 8/2010 | Agam et al. ................... | 382/128 |

OTHER PUBLICATIONS

Martin, "Using Bitmaps for Automatic Generation of Large-Scale Terrain Models", Gamasutra—The Art & Business of Making Games, Apr. 27, 2000, retrieved from <http://www.gamasutra.com/view/feature/3175/using_bitmaps_for_automatic_.php?page=2>.

* cited by examiner

*Primary Examiner* — Yosef Kassa
(74) *Attorney, Agent, or Firm* — McDermott Will & Emery LLP

(57) ABSTRACT

Systems and methods for generating a depth tile are provided. In some aspects, a system includes an alignment module configured to map each pixel of a depthmap to a corresponding pixel of a map tile. Each pixel of the depthmap includes a depth value, and each pixel of the map tile is associated with a terrain elevation value. The system also includes a transform module configured to adjust the depth value of each pixel of the depthmap based on a corresponding terrain elevation value. The system also includes a depth tile module configured to generate the depth tile. Each pixel of the depth tile includes a corresponding adjusted depth value.

28 Claims, 6 Drawing Sheets

SYSTEMS AND METHODS FOR GENERATING A DEPTH TILE

CROSS-REFERENCES TO RELATED APPLICATIONS

The present application claims the benefit of U.S. Provisional Patent Application Ser. No. 61/524,307, entitled "Systems and Methods for Generating a Depth Tile," filed on Aug. 16, 2011, which is hereby incorporated by reference in its entirety for all purposes.

FIELD

The subject technology generally relates to depth tiles and, in particular, relates to systems and methods for generating depth tiles for maps.

BACKGROUND

A software-based map is typically formed from a combination of map tiles. The map tiles convey two-dimensional positional information of structures, roads, and terrain on the map. While terrain models may be used in conjunction with the map tiles to convey some level of information regarding the depth of the terrain, neither the map tiles nor the terrain models convey detailed geometry and/or depth information of the structures.

SUMMARY

According to various aspects of the subject technology, a system for generating a depth tile is provided. The system comprises an alignment module configured to map each pixel of a depthmap to a corresponding pixel of a map tile. Each pixel of the depthmap comprises a depth value. Each pixel of the map tile is associated with a terrain elevation value. The system also comprises a transform module configured to adjust the depth value of each pixel of the depthmap based on a corresponding terrain elevation value. The system also comprises a depth tile module configured to generate the depth tile. Each pixel of the depth tile comprises a corresponding adjusted depth value.

According to various aspects of the subject technology, a computer-implemented method for generating a depth tile is provided. The method comprises mapping each pixel of a depthmap to a corresponding pixel of a map tile. Each pixel of the depthmap comprises a depth value. Each pixel of the map tile is associated with a terrain elevation value. The method also comprises adjusting the depth value of each pixel of the depthmap based on a corresponding terrain elevation value. The method also comprises generating the depth tile. Each pixel of the depth tile comprises a corresponding adjusted depth value.

According to various aspects of the subject technology, a machine-readable medium encoded with executable instructions for generating a depth tile is provided. The instructions comprise code for aligning each pixel of a depthmap with a corresponding pixel of a map tile. Each pixel of the depthmap comprises a depth value corresponding to a 3D point imaged by the depthmap. Each pixel of the map tile is associated with a terrain elevation value. The instructions also comprise code for adjusting the depth value of each pixel of the depthmap based on a corresponding terrain elevation value and a perspective-to-orthographic transform of a corresponding 3D point. The instructions also comprise code for generating the depth tile. Each pixel of the depth tile comprises a corresponding adjusted depth value.

According to various aspects of the subject technology, a system for generating three-dimensional (3D) points from a depth tile is provided. The system comprises an access module configured to access a depth tile corresponding to a map tile of a geographic area. Each pixel of the map tile is associated with a terrain elevation value. Each pixel of the depth tile comprises a depth value adjusted based on a corresponding terrain elevation value. The system also comprises a reconstruction module configured to generate a 3D point for each pixel of the depth tile.

According to various aspects of the subject technology, a computer-implemented method for generating three-dimensional (3D) points from a depth tile is provided. The method comprises accessing a depth tile corresponding to a map tile of a geographic area. Each pixel of the map tile is associated with a terrain elevation value. Each pixel of the depth tile comprises a depth value adjusted based on a corresponding terrain elevation value. The method also comprises generating a 3D point for each pixel of the depth tile.

According to various aspects of the subject technology, a machine-readable medium encoded with executable instructions for generating three-dimensional (3D) points from a depth tile is provided. The instructions comprise code for accessing a depth tile corresponding to a map tile of a geographic area. Each pixel of the map tile is associated with a terrain elevation value. Each pixel of the depth tile comprises a depth value adjusted based on a corresponding terrain elevation value. The instructions also comprise code for generating a 3D point for each pixel of the depth tile.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Depthmaps may be used to provide certain depth information of the structures on a map. These depthmaps, for example, may be generated from aerial images of the structures captured by source cameras, which provide perspective views of the structures. Multi-view stereo processing or other suitable techniques may be used to construct three-dimensional (3D) points of the structures in order to generate the depthmaps. The depthmaps provide the depth information based on the 3D points. For example, each pixel of the depthmaps may provide a depth value measured from a corresponding 3D point to a corresponding source camera. While this depth information is measured in relation to the source cameras, the depth information is not particularly helpful in describing the depth of the structures in relation to the map tiles of the map. Furthermore, the depth information provided by the depthmaps does not take into account the depth of the terrain already conveyed by terrain models associated with the map tiles. Terrain models are typically stored as a mesh. From this mesh, a terrain elevation value can be computed for each pixel of the map tiles.

Aspects of the subject technology solve the foregoing problem by generating depth tiles that provide accurate depth information of structures on a map. This depth information may account for perspective views as well as terrain on the map. In particular, this depth information is measured in relation to the map tiles of the map and also takes into account terrain elevation information already conveyed by the terrain models associated with the map tiles. A depth tile may be generated for each map tile of the map.

Figure 1:
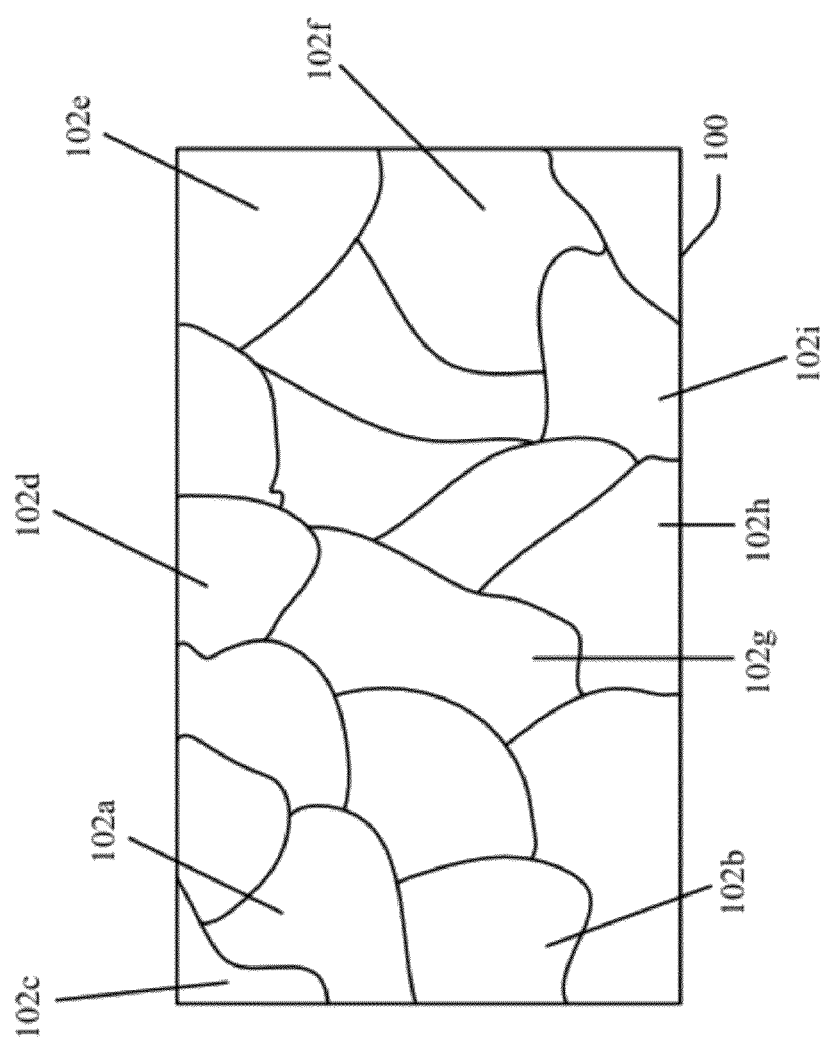
FIG. 1 illustrates an example of a plurality of map tiles, in accordance with various aspects of the subject technology.

FIG. 1 illustrates an example of a plurality of map tiles 102, in accordance with various aspects of the subject technology. As shown, map 100 comprises a plurality of map tiles 102 (e.g., 102a, 102b, 102c, 102d, 102e, 102f, 102g, 102h, 102i) that are stitched to one another. In this regard, map 100 may be considered a mosaic of map tiles 102. Aspects of the subject technology provide a way to generate a corresponding depth tile for each map tile of map 100. While a pixel of each map tile 102 comprises at least one color value (e.g., red, green, and/or blue values), a pixel of a depth tile comprises a depth value. Once the depth tiles are generated, they may be stitched together to generate a mosaic of depth tiles similar to the mosaic of map tiles. In generating map 100, various stitching algorithms may be employed to stitch map tiles 102 together, thereby forming the boundaries between map tiles 102. Transitions in texture data representing one or more edges of terrain features or structures in map tiles 102 are used to define these boundaries. According to certain aspects, the boundaries of map tiles 102 may also define the boundaries of the depth tiles generated.

Figure 2:
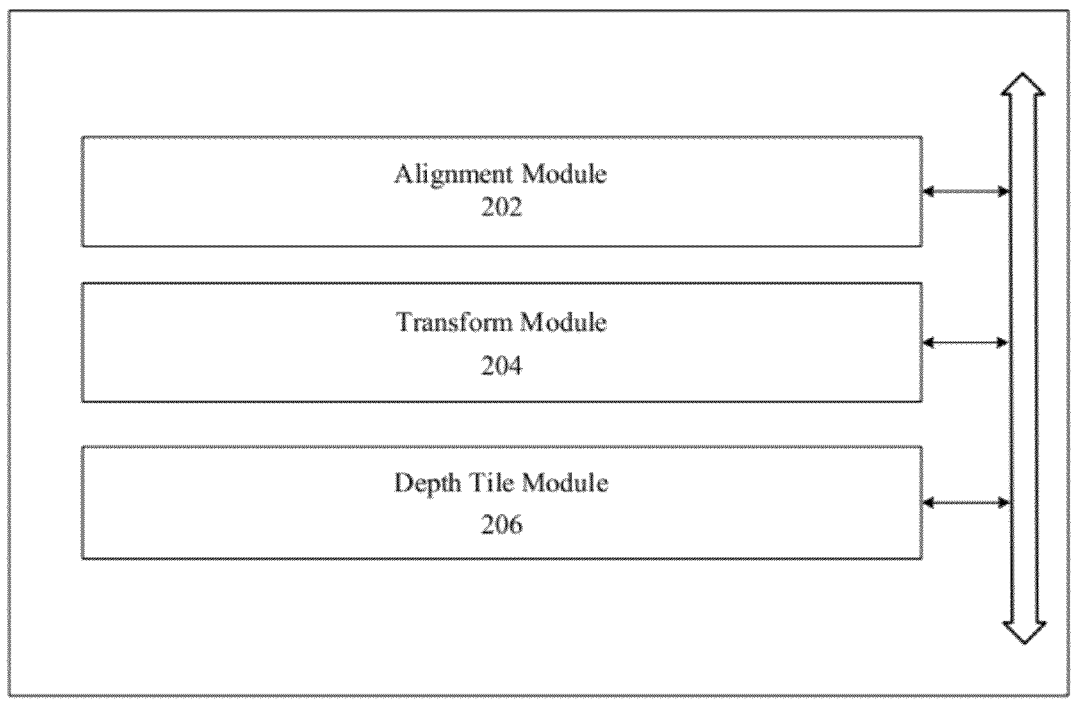
FIG. 2 illustrates an example of a system for generating a depth tile, in accordance with various aspects of the subject technology.

FIG. 2 illustrates an example of system 200 for generating a depth tile, in accordance with various aspects of the subject technology. System 200 comprises alignment module 202, transform module 204, and depth tile module 206. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
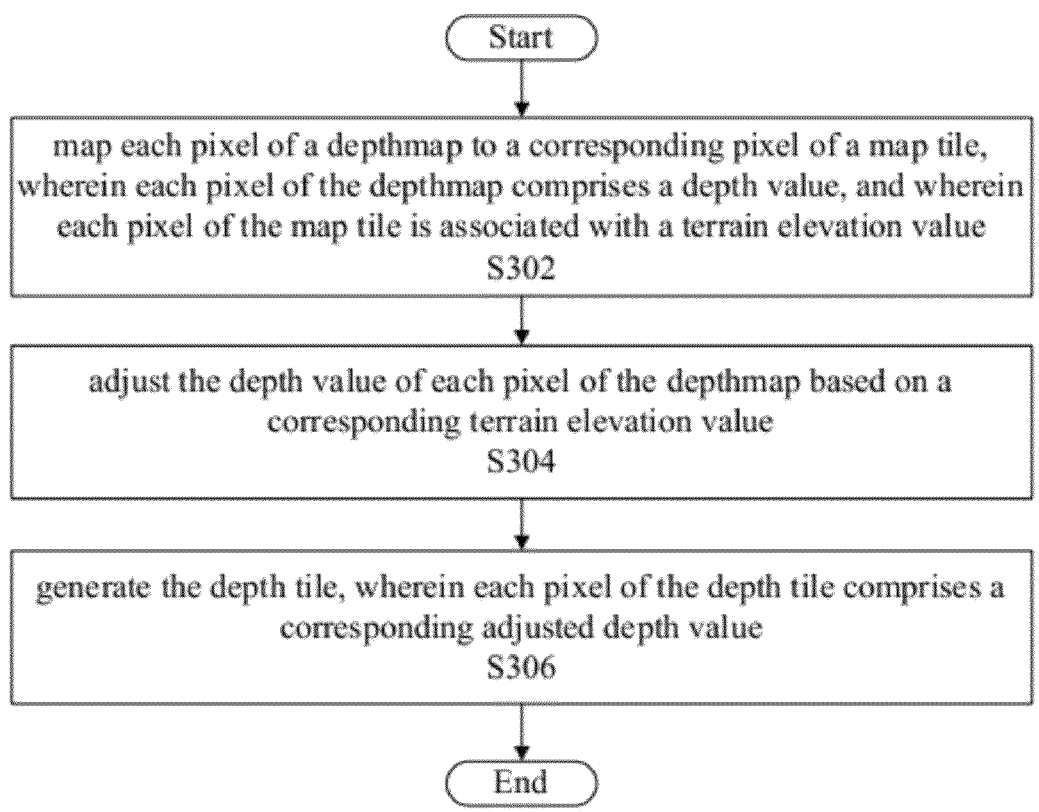
FIG. 3 illustrates an example of a method for generating a depth tile, in accordance with various aspects of the subject technology.
Figure 4:
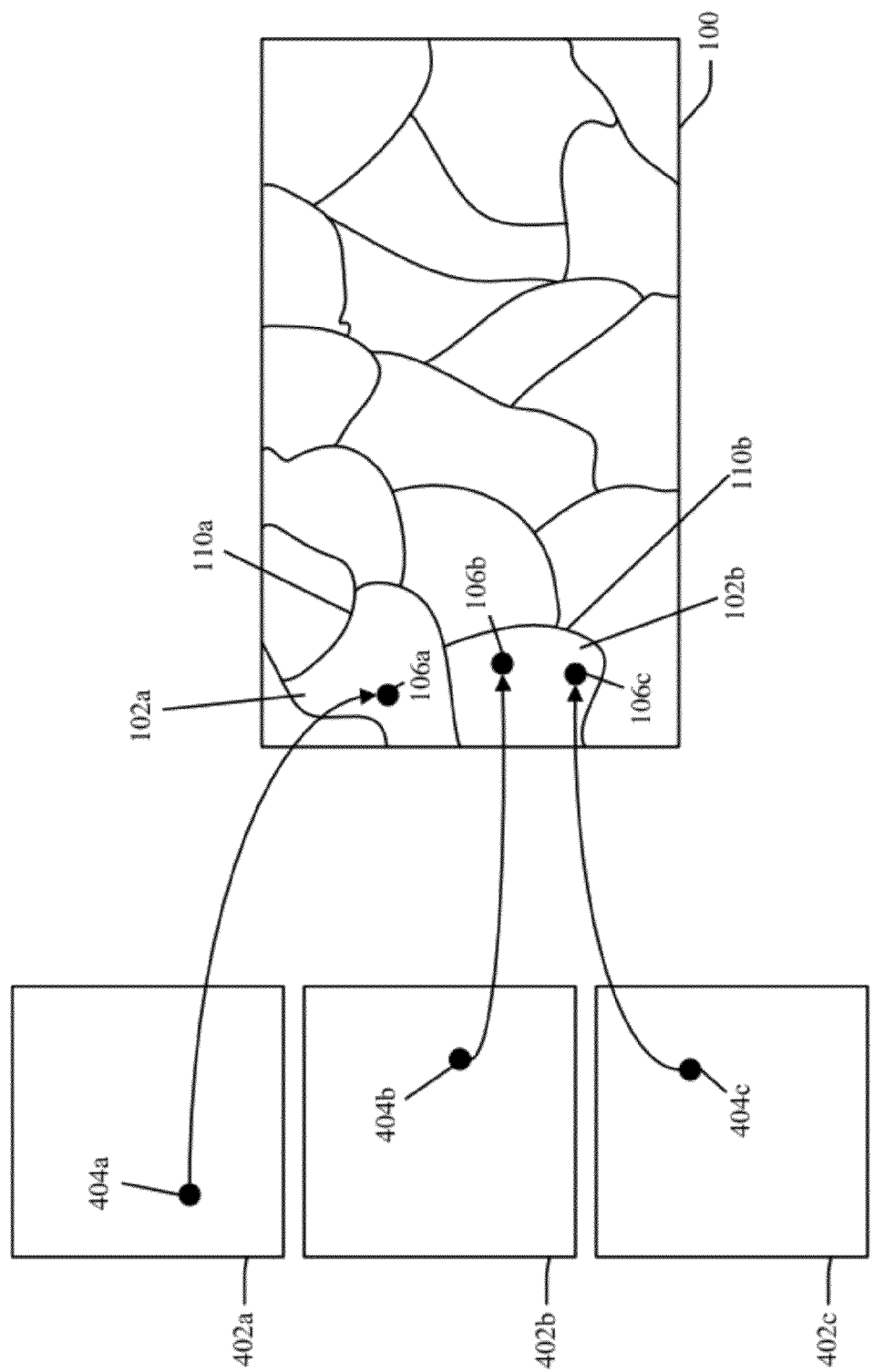
FIG. 4 illustrates an example of depthmaps being mapped to map tiles, in accordance with various aspects of the subject technology.

FIG. 3 illustrates an example of method 300 for generating a depth tile, in accordance with various aspects of the subject technology. System 200 may be used to implement method 300 for generating the depth tile. According to step S302, alignment module 202 is configured to map each pixel of a depthmap to a corresponding pixel of a map tile. FIG. 4 illustrates an example of depthmaps 402a, 402b, and 402c being mapped to map tiles 102a and 102b, in accordance with various aspects of the subject technology. For example, each pixel of a depthmap can be mapped to a corresponding pixel of a map tile. In FIG. 4, pixel 404a of depthmap 402a is mapped to pixel 106a of map tile 102a, pixel 404b of depthmap 402b is mapped to pixel 106b of map tile 102b, and pixel 404c is mapped to pixel 106c of map tile 102b.

Alignment module 202 may map depthmaps 402a, 402b, and 402c to map tiles 102a and 102b of map 100 by utilizing coordinate information associated with the pixels of depthmaps 402a, 402b, and 402c, coordinate information associated with the pixels of map tiles 102a and 102b, boundary information of map tiles 102, and/or other suitable information associated with map tiles 102. For example, alignment module 202 may map pixel 404a of depthmap 402a to pixel 106a of map tile 102a if the coordinate information associated pixel 404a matches the coordinate information associated with pixel 106a. Furthermore, alignment module 202 may select a particular depthmap to map to a particular map tile 102 based on whether the pixels of the particular depthmap correspond to pixels of the particular map tile 102 that are within its boundary. For example, alignment module 202 may select depthmap 402a from among a plurality of depthmaps as a candidate to map to map tile 102a because pixel 404a corresponds to pixel 106a, which is within boundary 110a. Similarly, alignment module 202 may select depthmaps 402b and 402c from among a plurality of depthmaps as candidates to map to map tile 102b because pixels 404b and 404c correspond to pixels 106b and 106c, respectively, which are both within boundary 110b. Boundaries 110a and 110b, as discussed above, may be the same boundaries as corresponding depth tiles to be generated for map tiles 102a and 102b, respectively. In some aspects, the boundary information associated with map tiles 102a and 102b may comprise at least one of boundaries 110a and 110b, texture data representing one or more edges of terrain features or structures in map tiles 102a and 102b, and color data corresponding to the one or more edges.

As discussed above, terrain models associated with the map tiles 102 may convey information about the depth of the terrain on map 100. In particular, each pixel of map tiles 102 may be associated with a terrain elevation value. This value may represent a height of various terrain on map 100, such as hills, mountains, valleys, and other types of terrain. According to step S304 of FIG. 3, transform module 204 is configured to adjust the depth value of each pixel of the depthmap (e.g., the depth value mapped to a corresponding pixel of a map tile 102) based on a corresponding terrain elevation value.

Figure 5A:
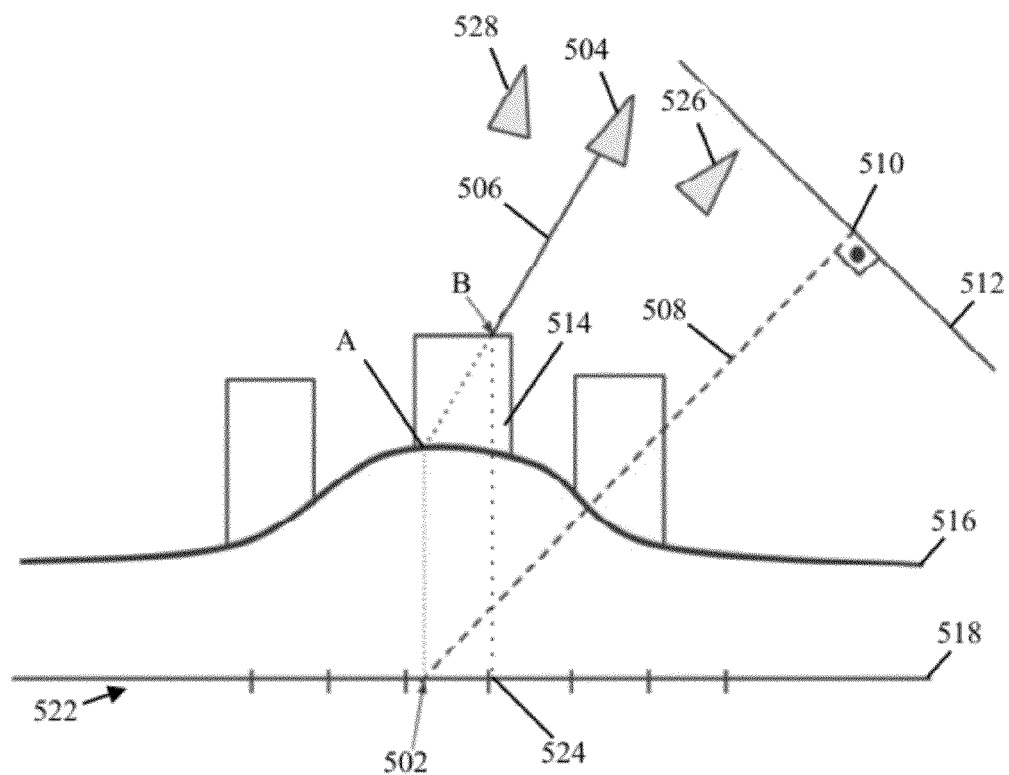
FIG. 5A illustrates an example of a structure disposed on top of terrain, in accordance with various aspects of the subject technology.

FIG. 5A illustrates an example of structure 514 disposed on top of terrain 516, in accordance with various aspects of the subject technology. Structure 514 is imaged by camera 504. The image of structure 514 captured by camera 504 may be converted into a depthmap using multi-stereo processing that also images structure 514. Thus, the pixels of this depthmap provide depth values of structure 514 measured relative to camera 504. Each depth value of the depthmap corresponds to a three-dimensional (3D) point imaged by the depthmap. For example, a 3D point of structure 514 at position B is imaged by the depthmap. The depth value for this 3D point at position B is measured between position B and camera 504 along perspective ray 506. The pixel of the depthmap storing this depth value is mapped to pixel 502 of map tile 522, as illustrated by projecting the 3D point at position B onto a projection location at position A along perspective ray 506. This projection location at position A is located on terrain 516 and corresponds to pixel 502 of map tile 522.

Although the depth value of the 3D point at position B is measured relative to camera 504, transform module 204 may adjust this depth value such that the 3D point at position B is measured in a coordinate space relative to ground plane 518. For example, transform module 204 may express the depth value of the 3D point at position B as coordinates (e.g., x, y, z coordinates) relative to ground plane 18. The x and y coordinates may represent latitude and longitude coordinates relative to ground plane 18, while the z coordinate may represent an elevation value relative to ground plane 18. In some aspects, ground plane 518 may represent a surface of the Earth adjusted to a sea-level elevation. Transform module 204 may adjust the depth values of the other 3D points in the depthmap in a similar manner.

Figure 5B:
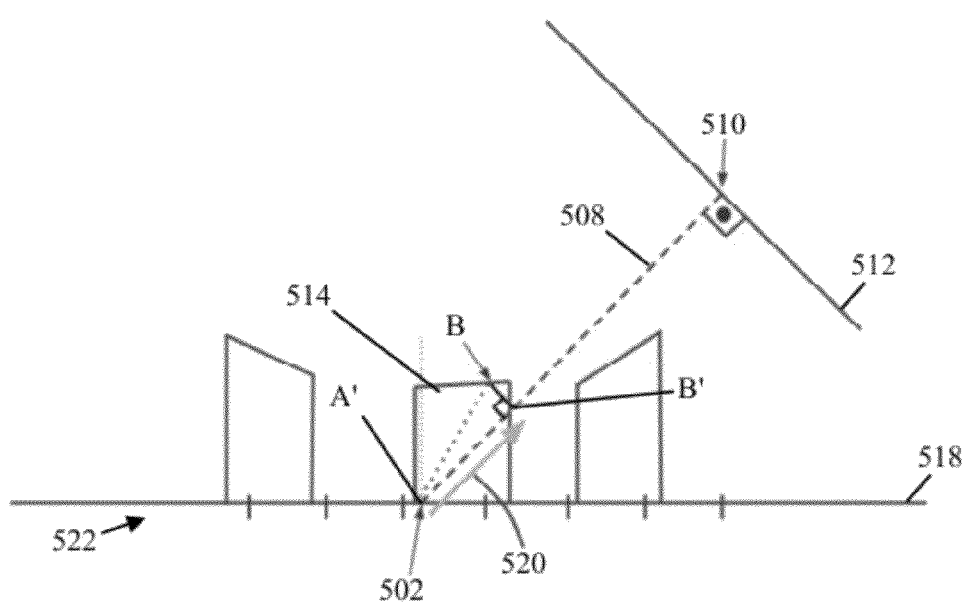
FIG. 5B illustrates an example of a structure with terrain removed, in accordance with various aspects of the subject technology.

After adjusting the depth values to be expressed in a coordinate space relative to ground plane 518, transform module 204 may adjust the depth values again based on terrain 516. For example, pixel 524 of map tile 522 may be associated with a terrain elevation value representing the influence of terrain 516. Transform module 204 may remove the influence of terrain 516 from the depth value of the 3D point at position B by subtracting the terrain elevation value from this depth value (e.g., subtracting the terrain elevation value from the z-coordinate of the 3D point at position B). Transform module 204 may repeat this process for the other 3D points in the depthmap. FIG. 5B illustrates an example of structure 514 with terrain 516 removed, in accordance with various aspects of the subject technology. By removing the influence of terrain 516, the adjusted depth values corresponding to the 3D points in the depthmap accurately take into account terrain 516, which is already conveyed by terrain models associated with map tile 522.

Although structure 514 is imaged by camera 504 under a perspective view, it is desirable to generate a uniform view of structure 514 that does not vary among different cameras. For example, camera 504 may provide a perspective view of structure 514 at a different angle than cameras 526 and 528 in FIG. 5A. Thus, it is desirable to provide a view of structure 514 from an orthographic view rather than a perspective view. In the orthographic view, for example, structure 514 is visible along orthographic rays that are parallel to one another (as opposed to perspective rays that converge at a single source camera). In some aspects, the desired depth tile 512 to be generated provides an orthographic view of structure 514. The orthographic rays (e.g., orthographic ray 508) from depth tile 512 are preferably angled at 45 degrees from ground plane 518 to provide a balanced view of both a top of structure 514 as well as a side of structure 514. However, other suitable angles for the orthographic rays may be used.

According to certain aspects, transform module 204 may perform a perspective-to-orthographic transform on the 3D points of the depthmap mapped to map tile 522 in order to generate depth tile 512, which provides the orthographic view of structure 514. Transform module 204 is configured to transform each 3D point to project onto ground plane 518 along a corresponding orthographic ray. For example, as shown in FIG. 5B, transform module 204 may transform the 3D point at position B, which already accounts for terrain 516 being removed, into the 3D point at position B', which projects onto a projection location at position A' on ground plane 518 along orthographic ray 508. With knowledge of the coordinates at position B, as well as the angle of orthographic ray 508, transform module 204 can determine the coordinates at position B' using trigonometry, for example. As shown in FIG. 5B, the transformed 3D point at position B' projects onto the same pixel (e.g., pixel 502) as the 3D point at position B before its transformation.

According to certain aspects, transform module 204 is configured to determine a distance 520 between the transformed 3D point at position B' and the projection location at position A' along orthographic ray 508. According to step S306 in FIG. 3, depth tile module 206 is configured to generate depth tile 512, for example, by storing distance 520 as the adjusted depth value for pixel 510 of depth tile 512. As shown in FIG. 5B, pixel 510 of depth tile 512 is aligned with pixel 502 of map tile 522. The foregoing method may be repeated to generate adjusted depth values for other pixels of depth tile 512. In some aspects, depth tile module 206 is configured to stitch depth tile 512 together with other depth tiles to generate a mosaic of depth tiles (e.g., similar to the mosaic of tiles depicted by map 100 in FIG. 1).

According to various aspects of the subject technology, once the depth tile is generated, it may be provided to various electronic devices (e.g., desktop computers, laptop computers, tablets, mobile phones, etc.) running mapping applications to reconstruct one or more mesh models associated with the depth tile. For example, a system of such an electronic device may comprise an access module configured to access the depth tile, which corresponds to a map tile of a geographic area. This system may also comprise a reconstruction module configured to generate a 3D point for each pixel of the depth tile. An elevation of each of these 3D points may be based on an adjusted depth value of a corresponding pixel of the depth tile. For example, an adjusted depth value may provide the elevation of a corresponding 3D point.

According to certain aspects, the reconstruction module may generate a mesh model based on the plurality of 3D points associated with the depth tile. This mesh model, for example, may represent at least a portion of an artificial structure (building, bridge, etc.) and/or a natural structure (e.g., mountain, hill, valley, etc.). To generate the mesh model, the reconstruction module may group three or more of the plurality of 3D points together (e.g., from pixels that are adjacent to one another). The reconstruction module may generate a surface of the mesh model based on the grouped 3D points. For example, the surface may be a triangular plane with each edge connecting two of the grouped 3D points. The surface may be other suitable shapes (e.g., a four-sided plane) that connect the grouped 3D points. The reconstruction module may repeat the grouping with other 3D points to generate other surfaces of the mesh model.

Figure 6:
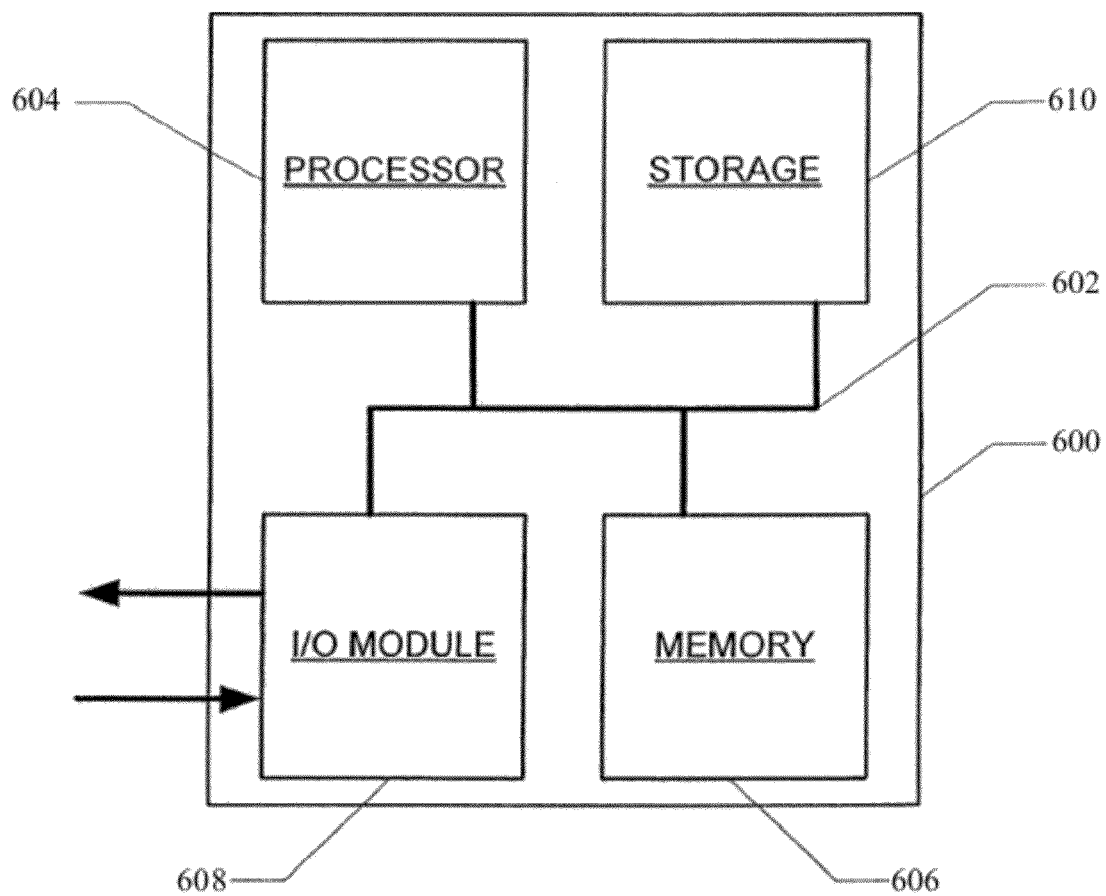
FIG. 6 is a block diagram illustrating components of a controller, in accordance with various aspects of the subject disclosure.

FIG. 6 is a block diagram illustrating components of controller 600, in accordance with various aspects of the subject disclosure. Controller 600 comprises processor module 604, storage module 610, input/output (I/O) module 608, memory module 606, and bus 602. Bus 602 may be any suitable communication mechanism for communicating information. Processor module 604, storage module 610, I/O module 608, and memory module 606 are coupled with bus 602 for communicating information between any of the modules of controller 600 and/or information between any module of controller 600 and a device external to controller 600. For example, information communicated between any of the modules of controller 600 may include instructions and/or data. In some aspects, bus 602 may be a universal serial bus. In some aspects, bus 302 may provide Ethernet connectivity.

In some aspects, processor module 604 may comprise one or more processors, where each processor may perform different functions or execute different instructions and/or processes. For example, one or more processors may execute instructions for implementing method 300, one or more processors may execute instructions for generating 3D points from a depth tile, and one or more processors may execute instructions for input/output functions.

Memory module 606 may be random access memory ("RAM") or other dynamic storage devices for storing information and instructions to be executed by processor module 604. Memory module 606 may also be used for storing temporary variables or other intermediate information during execution of instructions by processor 604. In some aspects, memory module 606 may comprise battery-powered static RAM, which stores information without requiring power to maintain the stored information. Storage module 610 may be a magnetic disk or optical disk and may also store information and instructions. In some aspects, storage module 610 may comprise hard disk storage or electronic memory storage (e.g., flash memory). In some aspects, memory module 606 and storage module 610 are both a machine-readable medium.

Controller 600 is coupled via I/O module 608 to a user interface for providing information to and receiving information from an operator of system 200. For example, the user interface may be a cathode ray tube ("CRT") or LCD monitor for displaying information to an operator. The user interface may also include, for example, a keyboard or a mouse coupled to controller 600 via I/O module 608 for communicating information and command selections to processor module 604.

According to various aspects of the subject disclosure, methods described herein are executed by controller 600. Specifically, processor module 604 executes one or more sequences of instructions contained in memory module 606 and/or storage module 610. In one example, instructions may be read into memory module 606 from another machine-readable medium, such as storage module 610. In another example, instructions may be read directly into memory module 606 from I/O module 608. Execution of the sequences of instructions contained in memory module 606 and/or storage module 610 causes processor module 604 to perform methods to generate a depth tile. For example, an algorithm for generating a depth tile and/or an algorithm for generating 3D points from a depth tile may be stored in memory module 606 and/or storage module 610 as one or more sequences of instructions. Information such as the depth values of the depthmaps and depth tiles, terrain elevation values, boundary information, coordinate information, projection locations, ground planes, 3D points, mesh models, and/or other suitable information may be communicated from processor module 604 to memory module 606 and/or storage module 610 via bus 602 for storage. In some aspects, the information may be communicated from processor module 604, memory module 606, and/or storage module 610 to I/O module 608 via bus 602. The information may then be communicated from I/O module 608 to an operator of system 200 via the user interface.

One or more processors in a multi-processing arrangement may also be employed to execute the sequences of instructions contained in memory module 606 and/or storage module 610. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 604 for execution. Such a medium may take many forms, including, but not limited to, non-volatile media, and volatile media. Non-volatile media include, for example, optical or magnetic disks, such as storage module 610. Volatile media include dynamic memory, such as memory module 606. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for generating a depth tile, the system comprising:
   an alignment module configured to map each pixel of a depthmap to a corresponding pixel of a map tile, wherein each pixel of the depthmap comprises a depth value, and wherein each pixel of the map tile is associated with a terrain elevation value;
   a transform module configured to adjust the depth value of each pixel of the depthmap based on a corresponding terrain elevation value; and
   a depth tile module configured to generate the depth tile, wherein each pixel of the depth tile comprises a corresponding adjusted depth value.

2. The system of claim 1, wherein the terrain elevation value represents the influence of terrain in the map tile, and wherein the transform module is configured to remove the influence of the terrain from a corresponding depth value.

3. The system of claim 2, wherein the transform module is configured to subtract the terrain elevation value from a corresponding depth value.

4. The system of claim 1, wherein each depth value of the depthmap corresponds to a three-dimensional (3D) point imaged by the depthmap, and wherein each 3D point is projected onto a corresponding pixel of the map tile along a corresponding perspective ray from a camera capturing the depthmap.

5. The system of claim 4, wherein the transform module is configured to transform each 3D point to project onto a ground plane of the map tile along a corresponding orthographic ray, wherein the transform module is configured to determine a distance between each transformed 3D point and the ground plane along a corresponding orthographic ray, and wherein the adjusted depth value of each pixel of the depth tile comprises the distance between each transformed 3D point and the ground plane along a corresponding orthographic ray.

6. The system of claim 5, wherein the orthographic ray is angled at 45 degrees from the ground plane.

7. The system of claim 5, wherein an orthographic ray corresponding to one of the transformed 3D points is parallel to an orthographic ray corresponding to another of the transformed 3D points.

8. The system of claim 5, wherein the ground plane of the map tile represents a surface of the Earth adjusted to a sea-level elevation.

9. The system of claim 5, wherein each transformed 3D point projects onto the same pixel of the map tile as a corresponding 3D point before its transformation.

10. The system of claim 5, wherein a projection location of each transformed 3D point along a corresponding orthographic ray is aligned with a corresponding pixel of the depth tile.

11. The system of claim 4, wherein each depth value of the depthmap is measured relative to the camera, wherein the transform module is configured to adjust each depth value of the depthmap based on a ground plane of the map tile, and wherein the adjusted depth value is measured relative to the ground plane of the map tile.

12. The system of claim 1, wherein each pixel of the map tile comprises one or more color values.

13. The system of claim 1, wherein the alignment module is configured to map each pixel of a depthmap to a corresponding pixel of a map tile based on at least one of coordinate information associated with a corresponding pixel of the depthmap, coordinate information associated with a corresponding pixel of the map tile, and boundary information associated with the map tile.

14. The system of claim 13, wherein the alignment module is configured to select the depthmap from among a plurality of depthmaps based on at least one of the coordinate information associated with a corresponding pixel of the depthmap, the coordinate information associated with a corresponding pixel of the map tile, and the boundary information.

15. The system of claim 13, wherein the boundary information comprises at least one of a boundary of the map tile, texture data representing one or more edges of a terrain feature and/or a structure in the map tile, and color data corresponding to the one or more edges.

16. The system of claim 1, wherein the depth tile module is configured to stitch the depth tile together with other depth tiles to generate a mosaic of depth tiles.

17. The system of claim 1, wherein a boundary of the depth tile matches a boundary of the map tile.

18. A computer-implemented method for generating a depth tile, the method comprising:
   mapping each pixel of a depthmap to a corresponding pixel of a map tile, wherein each pixel of the depthmap comprises a depth value, and wherein each pixel of the map tile is associated with a terrain elevation value;
   adjusting the depth value of each pixel of the depthmap based on a corresponding terrain elevation value; and
   generating the depth tile, wherein each pixel of the depth tile comprises a corresponding adjusted depth value.

19. The method of claim 18, wherein each depth value of the depthmap corresponds to a three-dimensional (3D) point imaged by the depthmap, wherein each 3D point is projected onto a corresponding pixel of the map tile along a corresponding perspective ray from a camera capturing the depthmap, and wherein the method further comprises:

transforming each 3D point to project onto a ground plane of the map tile along a corresponding orthographic ray; and determining a distance between each transformed 3D point and the ground plane along a corresponding orthographic ray, wherein the adjusted depth value of each pixel of the depth tile comprises the distance between each transformed 3D point and the ground plane along a corresponding orthographic ray.

20. A non-transitory machine-readable medium embodying executable instructions for generating a depth tile, the instructions comprising code for:

aligning each pixel of a depthmap with a corresponding pixel of a map tile, wherein each pixel of the depthmap comprises a depth value corresponding to a 3D point imaged by the depthmap, and wherein each pixel of the map tile is associated with a terrain elevation value;

adjusting the depth value of each pixel of the depthmap based on a corresponding terrain elevation value and a perspective-to-orthographic transform of a corresponding 3D point; and generating the depth tile, wherein each pixel of the depth tile comprises a corresponding adjusted depth value.

21. A system for generating three-dimensional (3D) points from a depth tile, the system comprising:

an access module configured to access a depth tile corresponding to a map tile of a geographic area, wherein each pixel of the map tile is associated with a terrain elevation value, and wherein each pixel of the depth tile comprises a depth value adjusted based on a corresponding terrain elevation value; and a reconstruction module configured to generate a 3D point for each pixel of the depth tile.

22. The system of claim 21, wherein an elevation of each of the plurality of 3D points is based on an adjusted depth value of a corresponding pixel of the depth tile.

23. The system of claim 21, wherein the reconstruction module is configured to generate a mesh model based on the plurality of 3D points.

24. The system of claim 23, wherein the mesh model comprises at least a portion of an artificial structure or a natural structure.

25. The system of claim 23, wherein the reconstruction module is configured to group three or more of the plurality of 3D points.

26. The system of claim 25, wherein the reconstruction module is configured to generate a surface of the mesh model based on the grouped 3D points.

27. The system of claim 26, wherein the surface comprises a triangular plane or a four-sided plane.

28. The system of claim 21, wherein each pixel of the depth tile is aligned with a corresponding pixel of the map tile.

* * * * *